C. Morgan,
Harness Fastener
N° 83,987.      Patented Nov. 10, 1868.
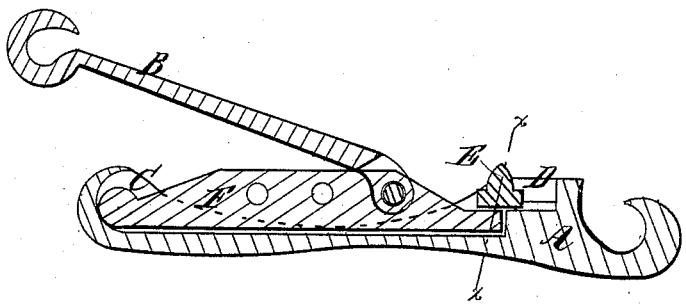
Witnesses:
Wm. A. Morgan.
G. C. Cotton.
Inventor.
Chas. Morgan
per Munn & Co
Attorneys.

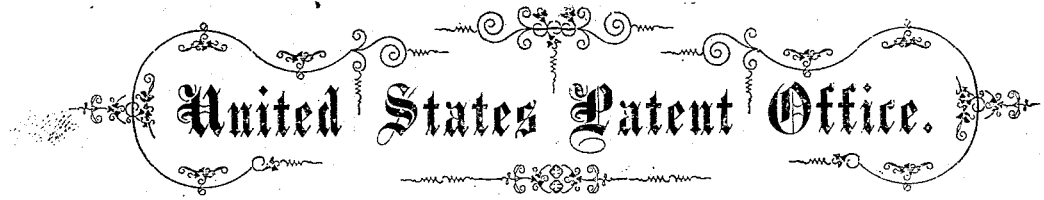

UNITED STATES PATENT OFFICE.

CHARLES MORGAN, OF WAUMANDEE, WISCONSIN.

Letters Patent No. 83,987, dated November 10, 1868.

IMPROVED HAMES-FASTENING.

The Schedule referred to in these Letters Patent and making part of the same.

*To all whom it may concern:*

Be it known that I, CHARLES MORGAN, of Waumandee, in the county of Buffalo, and State of Wisconsin, have invented a new and useful Improvement in Hames-Fastenings; and I do hereby declare that the following is a full, clear, and exact description thereof, which will enable others skilled in the art to make and use the same, reference being had to the accompanying drawings, forming part of this specification, in which—

Figure 1 represents a longitudinal section of my improvement; and

Figure 2 represents a transverse section on the line x x of fig. 1.

Similar letters of reference indicate corresponding parts.

The nature of this invention relates to improvements for fastening hames for horses, the object of which is to provide a durable fastening that can be readily fastened and unfastened.

It consists of a couple of hooks which are to be hooked into the metal loops on the ends of hames, and bent down so as to be retained therein. The stock of one of the hooks is provided with a socket in one end and a recess near the hook, provided with a slide. The stock of the other is jointed to a metal bar, one end of which is fitted to be inserted in the said socket, and the other in the said recess when it is secured by the slide.

A represents one of the hooks, and B, the other.

The hook A is provided with a socket, C, at the other end, and with a recess at D, wherein is a slide, E. The hook B is pivoted to a bar, F, which may be locked together with the stocks of the hook A, by inserting one end in the socket C, and the other in the recess D, and setting the slide E so as to overlap the last-mentioned end. The said bar is provided with a series of holes, whereby the distance of the hooks apart may be varied.

The hooks A and B are inserted in the metal loops of the hames, and bent over so that they cannot become detached therefrom, and are kept permanent in them.

To lock the hames together, the metal bar F is inserted within the socket, and the recess and the slide e set, as shown in the drawings. To unlock them it is only necessary to move the slide E back into the socket, when the bar will fall out.

It will thus be seen that I have provided a very simple hames-fastening, which can be fastened or unfastened with great facility, and which will not, of itself, become unfastened, the slide being made to work with considerable friction.

Having thus described my invention,

I claim as new, and desire to secure by Letters Patent—

The hames-fastener, constructed as described, of the bar A, provided with a socket, C, to receive the end of the bar F, carrying the hook B, which bar is held in place by the slide D, all operating as described, whereby, when the bar F is released by the slide, the hooks are detached from each other, as herein shown and described.

CHARLES MORGAN.

Witnesses:
L. SHELLEY,
L. WEINERS.